Aug. 9, 1966 Y. E. H. ANDERSSON ETAL 3,264,723
MEANS AND METHOD FOR EFFECTING AUTOMOBILE REPAIRS
Filed June 10, 1964 2 Sheets-Sheet 1
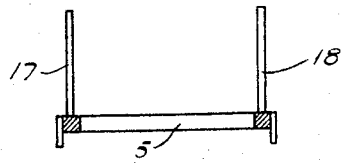
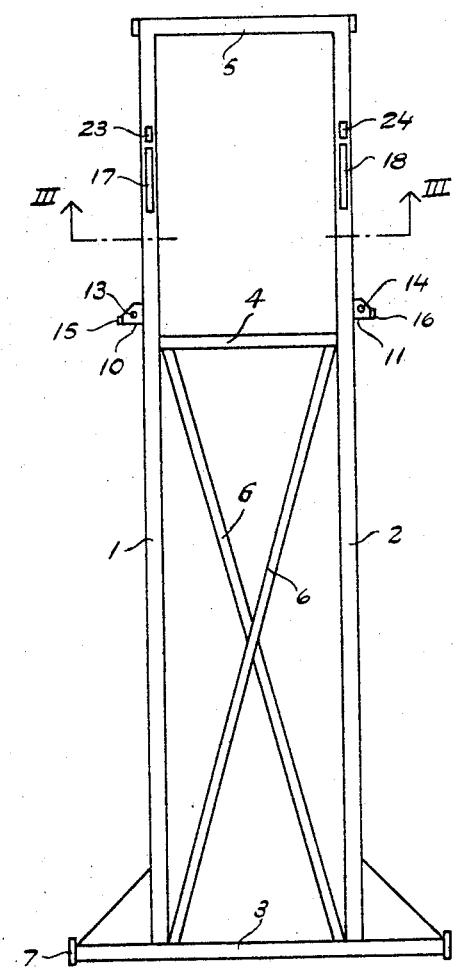
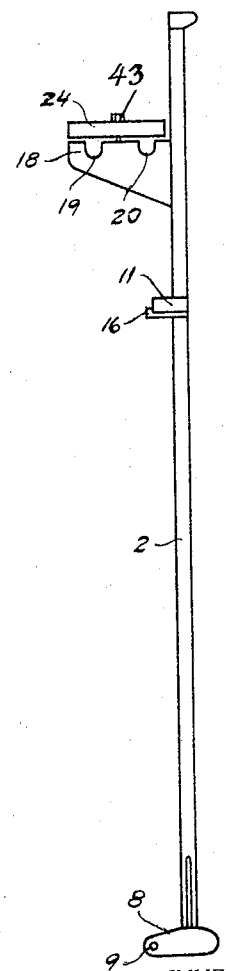
INVENTOR.
Yngve Elof Holger Andersson
Gösta Herbert Andersson
BY

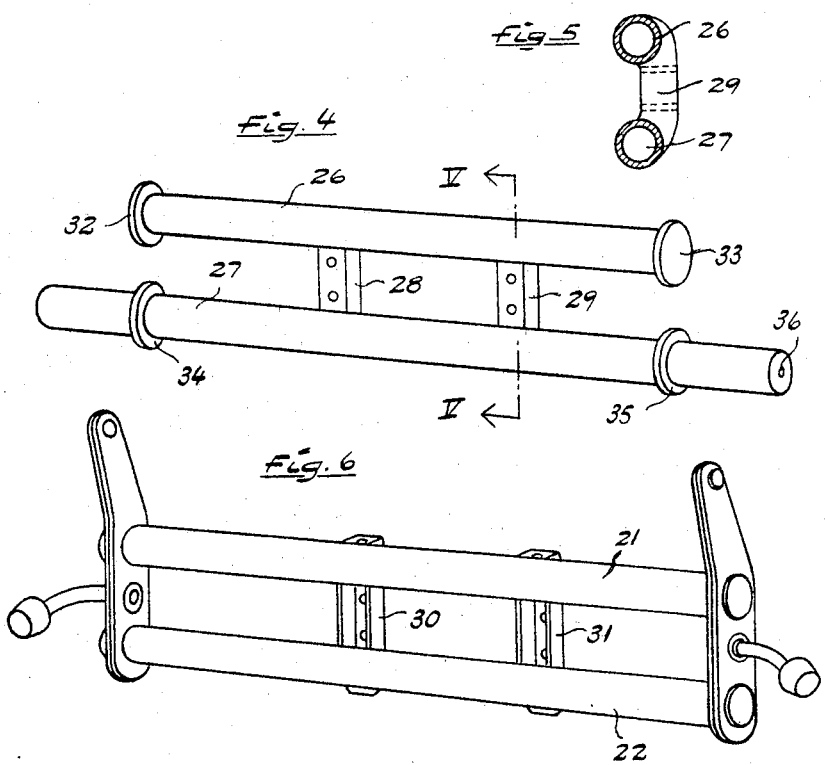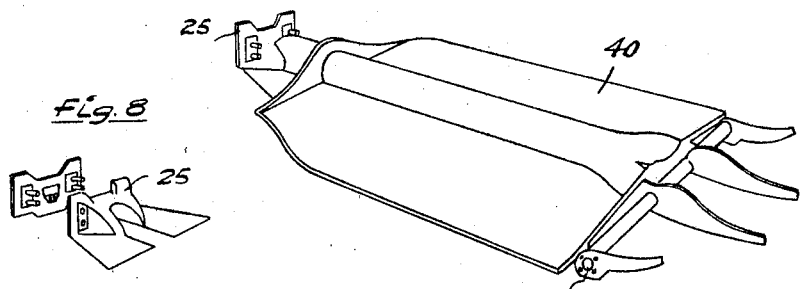

United States Patent Office 3,264,723
Patented August 9, 1966

3,264,723
MEANS AND METHOD FOR EFFECTING
AUTOMOBILE REPAIRS
Yngve Elof Holger Andersson, Smedstugugatan 16C, and Gosta Herbert Andersson, Tunnlandsgatan 17, both of Norrkoping, Sweden
Filed June 10, 1964, Ser. No. 374,037
Claims priority, application Norway, July 17, 1963, 149,434
6 Claims. (Cl. 29—401)

This invention relates to a means and method for effecting automobile repairs and particularly repairs which are required to the forward parts of the vehicle.

In certain types of automobiles, such as the Volkswagen for example, the under part of the vehicle includes a base plate which is provided at its forward end with a frame head which connects a front axle assembly to the base plate. In a collision the frame head is often so damaged as to require its replacement. When such replacement is required it has been necessary to remove the whole base plate from the vehicle and insert it in a fitting generally available at one of the larger service stations. Then the damaged frame head is cut away from the base plate and a new one is welded on after it has been brought into the correct position in the fitting. As a result, this repair is expensive and is time-consuming so that often instead of having his car repaired, the owner has preferred to discard or dispose of the vehicle and replace it with a new one.

The present invention therefore relates to a method and apparatus which permits the replacement of the frame head without requiring the detachment of the base plate from the vehicle, and the invention has for one of its objects the provision of means for effectively making the required repair to the vehicle with a minimum of time and expense.

The method of carrying out the invention is mainly characterized by first removing the damaged front axle assembly from the base plate while the base plate is retained in position on the vehicle. Then the damaged frame head that is at the time attached to the base plate, is cut away and a special fitting or fixture is mounted beneath the base plate and is secured to a rear axle part of the vehicle, and also to the front part of the base plate. This fitting permits the mounting of a new frame head in the correct position relative to the base plate and to the front axle part in order to permit the securement of the new frame head to the base plate by welding or otherwise.

The device according to the invention is characterized by the fact that it is provided with two tubes or bars extending longitudinally and which are held parallel to one another by at least two transversely-mounted struts and are braced and prevented from moving with respect to one another in a longitudinal direction by at least one crossed strut. These longitudinal bars are each provided at their rear ends with an upright for securing the fitting to the rear axle part of the car and with two pairs of uprights located at a certain distance apart in the longitudinal direction. The inner pair of uprights fixes the position of the jig or template in relation to the base plate, vertically and laterally, and the outer pair of uprights are provided with two recesses in each upright in the direction of their height in order to receive the axle tubes of the front axle assembly, or to receive similar substitute tubes of a holding device simulating the axle assembly.

The invention is illustrated in the accompanying drawings in which

FIG. 1 shows a fixture or fitting in plan view and in accordance with the invention;

FIG. 2 is a side elevational view of the fitting;
FIG. 3 is a sectional view through the fitting, taken along the line III—III of FIG. 1;
FIG. 4 shows in perspective a holding device for the fitting;
FIG. 5 is a sectional view taken on the line V—V of FIG. 4;
FIG. 6 is a perspective view of the front axle assembly of a Volkswagen car as seen from the rear;
FIG. 7 shows the frame head of the vehicle, and
FIG. 8 shows a detail.

Referring to the drawings, the fixture or fitting includes two longitudinal bars or tubes 1 and 2 which are mounted parallel to one another and are held at the required distance apart from one another by three transverse brace members 3, 4 and 5 and also by the crossed struts shown at 6. The bars or tubes 1 and 2 are each provided at one end with an upright 7, 8, the same having bolt holes 9. With these the fitting can be secured to the rear axle part of the car seen in FIG. 7 by bolts extended into the holes 37 provided therein, thus securing the rear part of the jig or template in the longitudinal and transverse axes in relation to the base plate 40 of the car. A pair of uprights is shown at 10 and 11, the same having holes 13 and 14 for the reception of bolts by which the jig or template is secured to the base plate 40 in holes provided therein. The uprights 10 and 11 have stops 15, 16 which bear against the side edges of the base plate 40 of the car. The position of the base plate is thereby determined both vertically and laterally. In front of the uprights 10 and 11 and at a short distance therefrom, the rods or bars 1 and 2 are provided with upwardly-directed members 17 and 18 having recesses 19, 20 at their forward sides. These recesses 19 and 20 receive the axle tubes 21, 22 of the assembled front axle part shown in FIG. 6, or if the axle assembly is in a damaged condition, a substitute therefor is used. Such substitute simulates the axle assembly and is shown in FIG. 4 and when it is used, its two tubes 26 and 27 are fitted in the recesses 19 and 20. The uprights 17 and 18 are provided on their front faces with clamps 23, 24 which are so arranged that they can be urged by means of clamping bolts 43 against the tubes 26, 27 of FIG. 4 or the tubes 21, 22 in FIG. 6 and hold the tubes firmly.

The device is employed as follows:
The front end of the vehicle is jacked up by means of jacks or props placed beneath the base plate 40 and the front axle part, or that shown in FIG. 6 is detached. The damaged frame head 25 (FIG. 7) is then cut away and the fitting is mounted in the manner heretofore described beneath the base plate. By measurements between the transverse members of the jig, it can be determined whether or not the base plate has become distorted by reason of the collision.

In the recesses or grooves 19 and 20 are placed the tubes 26, 27 associated with the holding device of FIG. 4 and said tubes are clampingly held in the recesses or grooves by means of the clamps 23 and 24. It will be noted that there is provided on the tube 26 by welding, two fastening members 28, 29 which correspond to the fastening position of the two front axle parts 30 and 31 of the actual axle assembly shown in FIG. 6. The tube 26 is provided at its ends with disk-shaped flanges 32 and 33 which bear on the outer sides of uprights 17 and 18 and prevent lateral displacement of the tubes. Also the tube 27 is provided with flanges 34, 35 serving as lateral guides. The tube 27 is approximately as long as the cross bar 3 and has centering holes 36 on its end faces for controlling the distance from the ends of the tube 27 to the ends of the bar 3. The frame head 25 can now be screwed firmly to the fastening members 28 and 29 and then connected to the base plate at the correct position in relation thereto by welding. Thereupon the fitting is removed and the front axle assembly is secured to the then attached frame head.

Instead of using a holding device, the front axle assembly can, if not damaged, be mounted directly, with its tubes 21 and 22 positioned in the recesses or grooves 19 and 20 and the frame head then secured for welding to the fastening members 30 and 31.

Having thus described a single embodiment of the invention, it is obvious that the same is not to be restricted thereto, but it broad enough to cover all structures coming within the scope of the annexed claims.

What I claim is:

1. The method of replacing a damaged frame head in a car of the Volkswagen type and which frame head connects the front axle assembly with the base plate on the under side of the vehicle, characterized by the fact that the front axle part is first removed from the base plate and the base plate is permitted to remain in place on the vehicle; the damaged frame head is then cut away; a fitting is mounted beneath the base plate and is fixed in relation to a rear part of the vehicle and is also fixed to a front part of the base plate so that the fitting permits of the mounting of a new frame head in the correct position in relation to the base plate and to the front axle part, whereby the frame head may be secured to the base plate by welding.

2. A method according to claim 1, characterized by the fact that a holding device which includes two transversely-disposed tubes, is mounted in recesses in two uprights projecting from the fitting in a position which corresponds to the seating of the axle tubes that form a part of the front axle assembly, and the frame head is secured to the holding device by fastening elements and is then welded to the base plate.

3. The method of replacing a frame head on a Volkswagen car comprising, supporting the car by means disposed under the base plate of the same, removing the front axle assembly, detaching the frame head from the base plate, supporting a simulated front axle assembly at the forward end of the base plate and in the same position formerly occupied by the removed axle assembly, removably attaching a replacement frame head to the simulated front axle assembly to thereby position the replacement frame head correctly in respect to the base plate, then welding the frame head to the base plate, then removing the simulated front axle assembly and replacing it with a real front axle assembly.

4. A device for facilitating the replacement of a frame head in a car of the Volkswagen type, characterized by the face that such device includes a frame having two bars extending longitudinally, said bars being disposed parallel to one another by transversely mounted struts, and secured against relative displacement in the longitudinal direction by cross braces, said longitudinal bars being each provided at their rear ends with an upright for the securing of the frame to a rear axle part of the car, the longitudinal bars having two pairs of uprights mounted at a certain distance apart in the longitudinal direction, of which an inner pair is adapted to fix the position of the frame in relation to the base plate both laterally and vertically and the outer pair is provided with two recesses in each upright in the vertical direction and is adapted to receive the axle tubes of the front axle assembly or the two tubes of a simulated axle assembly forming part of a holding device.

5. A fitting for facilitating the replacement of a damaged frame head on the forward end of the base plate of a car of the Volkswagen type comprising, a fitting including a frame adapted to be secured below the base plate of the car, said fitting including a pair of grooved uprights in which parallel bars on a simulated front axle assembly are mounted after the damaged frame head has been removed from its attachment to the base plate, said simulated axle assembly including parts by which a new frame head may be bolted to it to thereby place the new frame head in the position formerly occupied by the damaged frame head while it was attached to the base plate, the support of the new frame head by the simulated axle assembly enabling the new head to be welded to the end of the base plate and at the proper place thereon to accurately replace the damaged frame head.

6. An apparatus for positioning and repairing a damaged frame head of a small car comprising, a frame including two substantially parallel bars maintained in parallelism by several transverse brace members extending between them, an X-shaped bracing means also extending between the bars, the bars having an upright at one end by which the frame is attachable to the rear axle portion of the car to be repaired, the bars having additional uprights for properly locating the frame in relation to the car to effect the required repair thereto, the bars being each provided at its forward end with a front upright, said front uprights having recesses for supporting the axle tubes of the car or substitutes therefor in proper position at the front of the car while a frame head is welded to the base plate of the car.

References Cited by the Examiner

UNITED STATES PATENTS

| | | | |
|---|---|---|---|
| 1,059,789 | 4/1913 | Vauclain | 29—200 |
| 1,243,574 | 10/1917 | Wood | 269—303 X |
| 1,263,739 | 4/1918 | Brown | 29—401 |
| 1,910,273 | 5/1933 | Young | 29—401 |
| 2,680,287 | 6/1954 | Wilson | 29—200 |
| 2,799,920 | 7/1957 | Hanson | 269—303 X |

JOHN F. CAMPBELL, *Primary Examiner.*

THOMAS H. EAGER, *Examiner.*